UNITED STATES PATENT OFFICE.

OTTO LIEBKNECHT, OF FRANKFORT-ON-THE-MAIN, GERMANY, ASSIGNOR TO THE ROESSLER & HASSLACHER CHEMICAL COMPANY, OF NEW YORK, N. Y., A CORPORATION OF NEW YORK.

PROCESS OF MAKING CALCIUM PEROXID.

No. 847,670.      Specification of Letters Patent.      Patented March 19, 1907.

Application filed June 8, 1906. Serial No. 320,691.

*To all whom it may concern:*

Be it known that I, OTTO LIEBKNECHT, a subject of the German Emperor, and a resident of Frankfort-on-the-Main, Germany, have invented a certain new and useful Process of Making Calcium Peroxid, of which the following is a specification.

One way of obtaining calcium peroxid has been to treat lime-water with hydrogen peroxid. This process is of course not a technical one, as lime is but slightly soluble in water. Another way of making this peroxid comprises the treating of hydrates of sodium dioxid with hydrate of calcium; but this process requires the preparation of hydrate of sodium peroxid, which is very expensive.

I have discovered a new method whereby calcium peroxid is readily and practically produced and which is based on the following principles: Solutions of calcium salts—as, for instance, calcium chlorid—are not precipitated by ammonia. Further, calcium oxid is dissolved in solutions of ammonium salts—as, for instance, chlorid of ammonia—setting free at the same time ammonia, because oxid of calcium is a stronger base than ammonia. Now if hydrogen peroxid is added to an ammoniacal solution of calcium chlorid, calcium-peroxid hydrate is precipitated in fine crystals. If molecular proportions are taken, an amount of calcium-peroxid hydrate ($CaO_2 + 8H_2O$) corresponding to the quantity of hydrogen-peroxid solution used is obtained. Of course the process may be changed by giving an ammoniacal hydrogen-peroxid solution to a solution of calcium chlorid or by making a solution containing chlorid of calcium and hydrogen peroxid ammoniacal. Further, oxid of lime is soluble in sugar or glycerin under formation of strong alkaline reacting compounds. If neutral or alkaline solutions of hydrogen peroxid are treated with such alkaline solutions of calcium compounds, calcium peroxid is precipitated in crystalline form. In all these cases the calcium radical is either bound on a weak acid, as which alcohols, such as glycerin or sugar, have to be considered, or the reaction of the strong acid on which the calcium is bound is weakened by another base—as, for instance, ammonia—but which cannot precipitate the calcium. The calcium oxid is in a latent state, out of which it can be precipitated in form of the peroxid by means of hydrogen peroxid, and in each of the instances stated the solution is such as to prevent the precipitation of calcium oxid before its reaction with the hydrogen peroxid.

The following examples illustrate some ways of carrying out my process:

First. Four hundred and fifty parts of crystallized calcium chlorid are dissolved in water. To this is added an ammoniacal solution of hydrogen peroxid, which is obtained by entering one hundred and sixty parts of sodium peroxid in ice and water and adding to it one hundred and fifteen parts of ammonium chlorid. In order to precipitate all the calcium peroxid, about one hundred and fifty cubic centimeters of concentrated ammonia solution are added. During the entire operation care must be taken that the temperature remains low, which can be easily done by adding ice to the liquor from time to time, as required. It is preferable to stir during the operation. The precipitate is then filtered off, washed, and dried in the air. In this way four hundred parts of pure crystallized calcium-peroxid hydrate are obtained. By drying the crystals further the calcium-peroxid hydrate can be transformed into calcium peroxid.

Second. Eighty parts of sugar are dissolved in water, eleven parts of slaked lime are added, and the mixture shaken until the lime is dissolved. To this solution, after having been filtered, if necessary, a neutral ammoniacal or alkaline solution of hydrogen peroxid is added, whereby the calcium-peroxid hydrate is precipitated, which is then treated as above. Of course it is understood that it is not necessary in a continuous run to use such large quantities of chlorid of ammonia or sugar as mentioned in the example, as they can be regained during the process, as will be seen from the following equations:

1. $Na_2O_2 + 2NH_4Cl = H_2O_2 + 2NaCl + 2NH_3$.

2. $2NH_3 + H_2O_2 + CaCl_2 + 8H_2O =$
$$2NH_4Cl + CaO_2 + 8H_2O.$$

3. $2NH_4Cl + Na_2O_2 =$
$$H_2O_2 + 2NaCl + 2NH_3, \&c.$$

It is the same way with sugar.

It is obvious that the above-described means of carrying out the process may be varied in many ways without departing from the spirit of my invention, and I do not restrict myself to the means disclosed.

What I claim, and desire to secure by Letters Patent of the United States, is—

1. A process of making calcium peroxid consisting in reacting a solution of hydrogen peroxid with a solution containing calcium oxid in a non-precipitated state.

2. A process of making calcium peroxid consisting in reacting hydrogen peroxid with calcium salts in an ammoniacal solution.

In witness whereof I have hereunto signed my name in the presence of two subscribing witnesses.

OTTO LIEBKNECHT.

Witnesses:
 HORSH ZIEGLER,
 JEAN GRUND.